No. 711,980. Patented Oct. 28, 1902.
A. S. KROTZ.
MACHINE FOR EQUIPPING VEHICLE WHEELS WITH RUBBER TIRES.
(Application filed Aug. 3, 1901.)
(No Model.) 3 Sheets—Sheet 3.

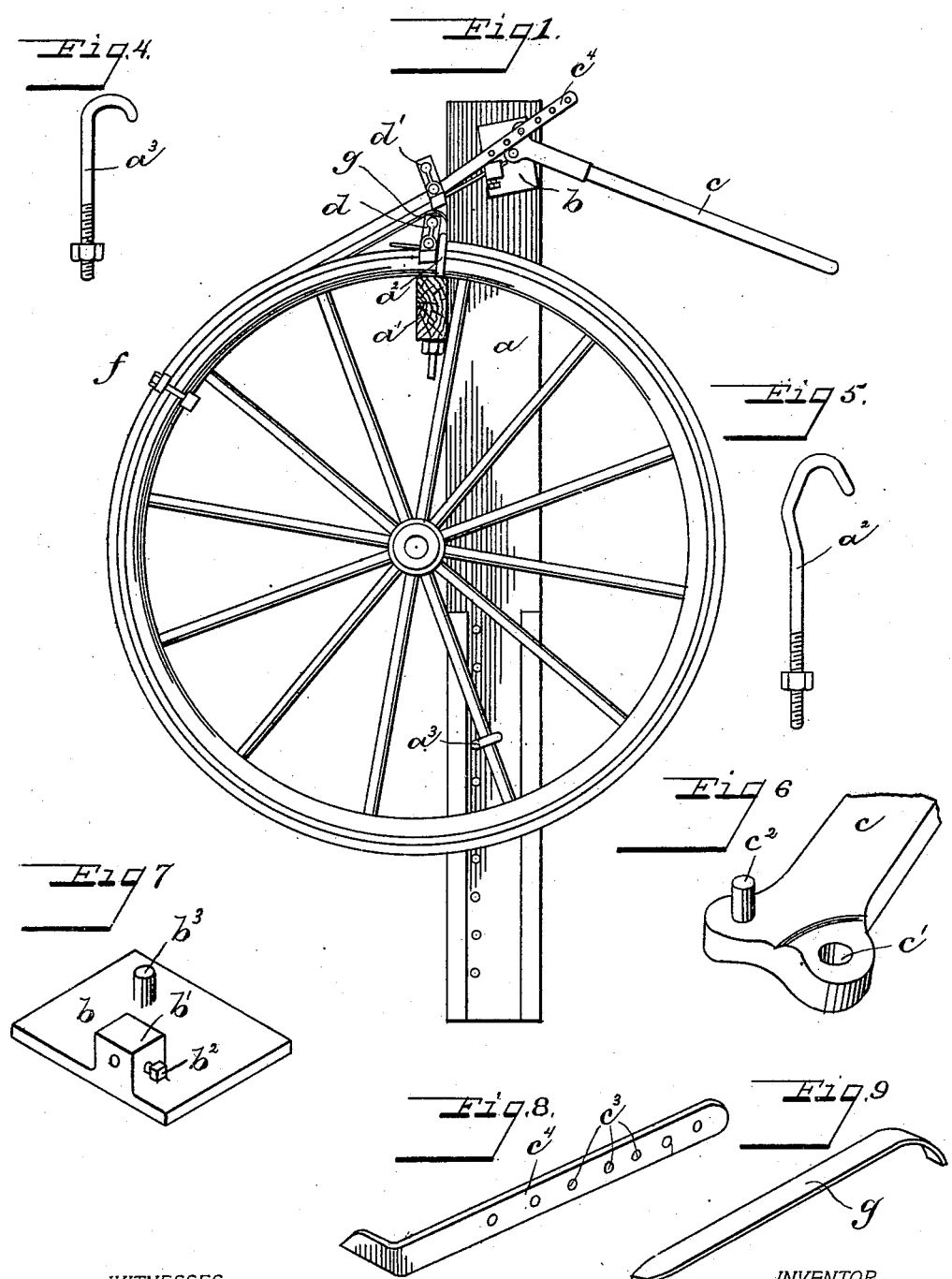

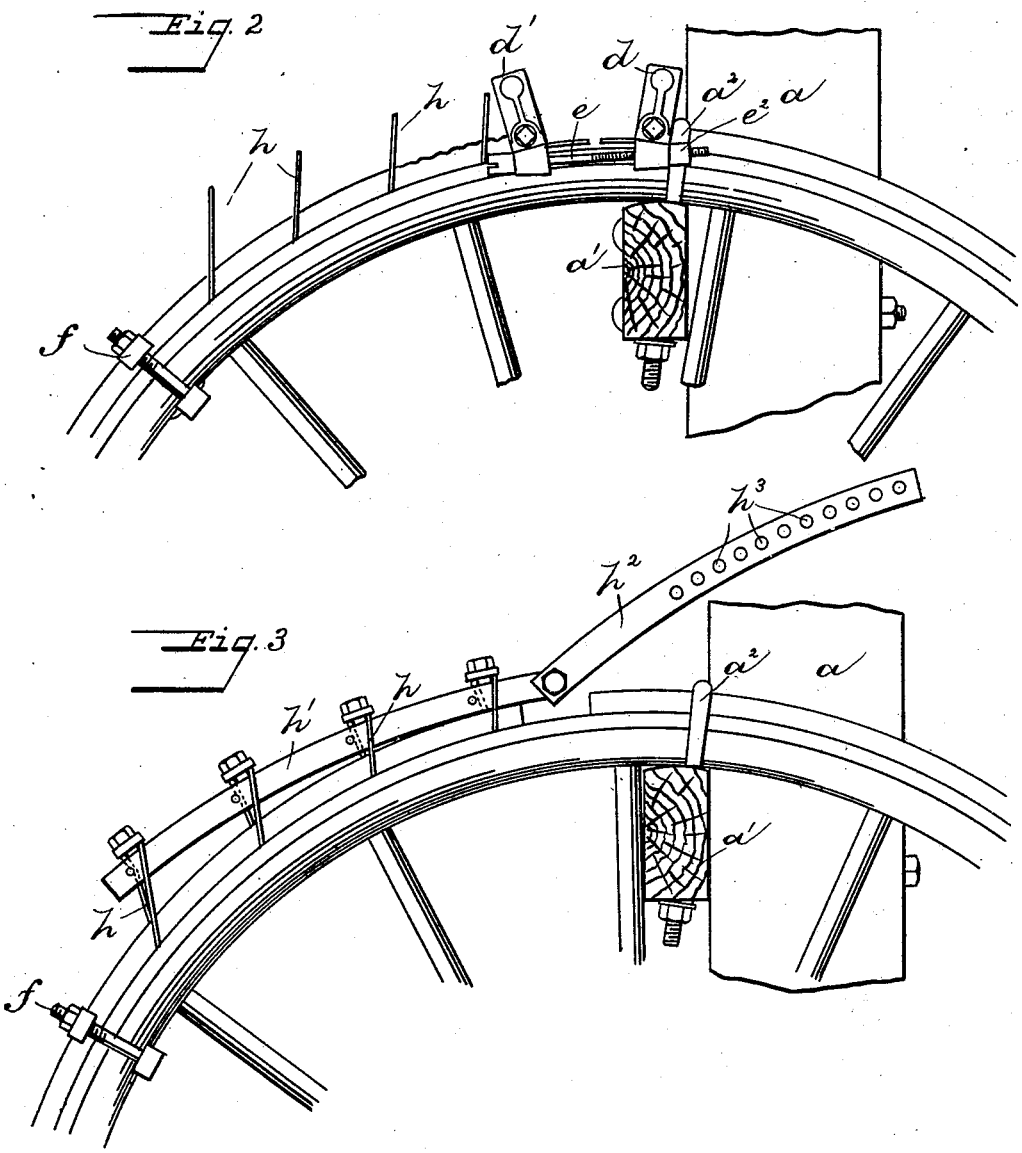

WITNESSES:
T. Llewellyn Walker
Clifton P. Grant

INVENTOR.
Alvaro S. Krotz
BY
Paul A. Staley
ATTORNEY.

UNITED STATES PATENT OFFICE.

ALVARO S. KROTZ, OF SPRINGFIELD, OHIO, ASSIGNOR TO CONSOLIDATED RUBBER TIRE COMPANY, OF JERSEY CITY, NEW JERSEY, A CORPORATION OF NEW JERSEY.

MACHINE FOR EQUIPPING VEHICLE-WHEELS WITH RUBBER TIRES.

SPECIFICATION forming part of Letters Patent No. 711,980, dated October 28, 1902.

Application filed August 3, 1901. Serial No. 70,721. (No model.)

*To all whom it may concern:*

Be it known that I, ALVARO S. KROTZ, a citizen of the United States, residing at Springfield, in the county of Clark and State of Ohio, have invented certain new and useful Improvements in Machines for Equipping Vehicle-Wheels with Rubber Tires, of which the following is a specification.

My invention relates to improvements in machines for equipping vehicle-wheels with rubber tires.

In the use of machinery for applying rubber tires to the wheels of vehicles it is important that the rubber tire be applied properly. The difficulties in applying properly the rubber tire are due to the different sizes of rubber tires that have to be applied and the different kinds of rubber that are used in the construction of a rubber tire.

My object is to construct a simple and improved machine which can be used for applying properly rubber tires of different sizes by an ordinary mechanic.

Figure 10:
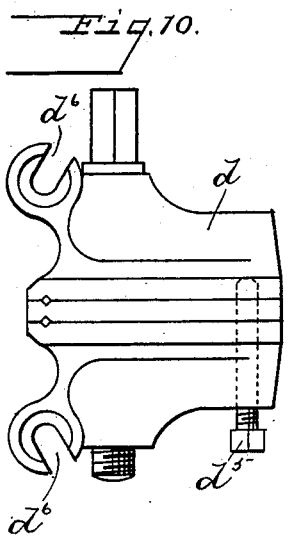
Figure 11:
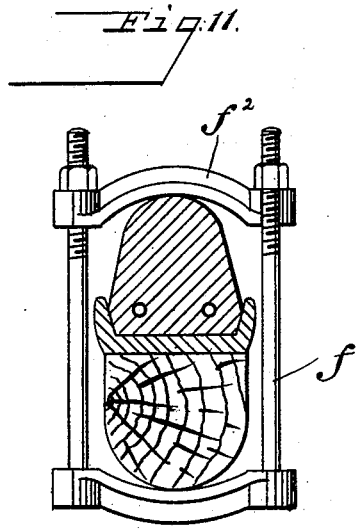
Figure 13:
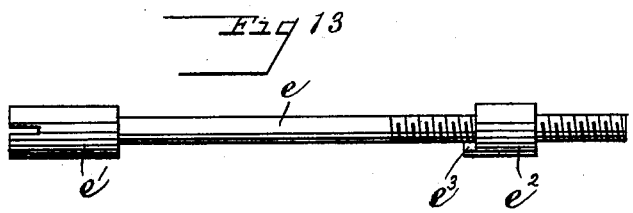
Figure 12:
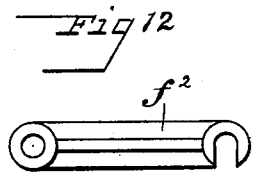

In the accompanying drawings, Figure 1 is a front view of the machine, showing the parts in position for compressing the rubber. Fig. 2 is a view of a portion of the same, showing the devices for tightening the wires. Fig. 3 is a front view of same, showing the device for closing the space between the ends of the rubber. Figs. 4 and 5 are details of the clamps. Fig. 6 is a detail view of a portion of the operating-lever, and Fig. 7 is a view of the support therefor. Fig. 8 is a detail of a part of the rubber-compressing mechanism. Fig. 9 shows the guide-plate. Fig. 10 is a side view of one of the clamping-jaws. Fig. 11 is a view of the clamp for clamping the rubber to the channel. Fig. 12 is a plan view of a portion of the clamp. Fig. 13 is a detail view of the device for tightening the wires.

Like parts are represented by similar letters of reference throughout the several views.

In the drawings I have shown a vertical supporting-post $a$; but it is readily understood that the position of said post is not material.

My machine is intended for applying rubber tires to vehicle-wheels, the rims of which wheels have channel-irons for holding the rubber tires, and I have shown two independent retaining-wires as the preferable means of holding the rubber within the channel-iron.

The post $a$ can be supported in any suitable manner by securing it to a wall or other convenient place. Secured to the upper part of this support $a$ by bolts or otherwise is a forwardly-extending supporting-piece $a'$, which is perforated to receive a clamp $a^2$, the specific construction of said clamp being shown in Fig. 5. The lower portion of the support $a$ is provided with a series of perforations to receive a similar clamp $a^3$. I have shown a plate $b$, attached to the upper part of said support $a$, which plate is provided with a block $b'$, having an opening to receive the ends of the retaining-wires heretofore mentioned, and a set-screw $b^2$ is used for securely holding said wires within said opening. A projecting pin or trunnion $b^3$ is for supporting the operating-lever $c$. In Fig. 6 I have shown the operating-lever provided with a bearing $c'$ for said trunnion $b^3$ and also provided with a projecting pin $c^2$, which is adapted to engage any one of the series of perforations $c^3$ in the bar $c^4$, which is used as a part of the compressing mechanism. The clamping-jaws $d$ hold securely the retaining-wires within the channel-iron and are formed in such manner that the notched holding-faces and pivoted tongue extend within the channel-iron and the jaw itself rests against the clamp $a^2$. The jaws $d$ and the jaw $d'$, hereinafter described, are of the same construction, and each is provided with an enlarged slotted portion $d^6$, which slotted portions are adapted to receive the tightening or tension screw $e$, which will be more fully described hereinafter.

The operation of the machine as thus far described is as follows: The vehicle-wheel is placed upon the support or post $a$, with a spoke of said wheel on the right side of the support $a'$ and with the rim of said wheel resting upon the raised portions of said post and clamped against the raised portions by the clamp $a^3$, the felly of the wheel having been previously equipped with the channel-iron. One end of the rubber tire, with the retaining wires inserted therein, is then placed in the channel, the ends of said retaining-wires projecting beyond the ends of the rubber tire. The ends of the wires are passed through the jaws of said clamp $d$ a suitable distance for splicing. The ends of the wires are then scarfed on the upper sides thereof and the wires readily turned until the flattened surfaces face the channel. One end of the rubber is clamped by the clamp $a^2$ in such manner that the felly of the wheel is held securely against the upper end of the support $a'$, the jaws of the band-holding device $d$ being also held in position by said clamp, and by means of the two clamps $a^3$ and $a^2$ the wheel is securely supported by said post against movement in such manner that there is an open space between the wheel and the support for the more ready adjustment of the parts of the machine. The jaws $d$ are clamped to the wires, as heretofore explained, by the ordinary use of a screw, such as shown in Fig. 10, (marked $d^5$.) The rubber tire is then placed around the wheel within the channel and the other ends of the wires passed through the perforations in the block $b'$ on the plate $b$, drawn as tight as possible by hand, and then fastened in the hole by the set-screw $b^2$.

It is seldom that in the different sizes of rubber tires and with the different kinds of rubber and other constituent elements, such as the canvas ordinarily used at the bottom of the rubber, that the rubber is placed within the channel in a manner to allow for the proper amount of compression. Very much depends on the care with which the operator of the machine adjusts the rubber tire within the channel-iron, and much depends upon the quality of the rubber that is used as to whether the rubber will be placed within the channel in a manner that will insure the ends of the rubber being fastened with the proper amount of compression in the rubber, it being understood that the length of the rubber is made greater than the periphery of the wheel in order to obtain a certain amount of compression. I have found that if the free end of the rubber tire extends so as to overlap the stationary end of the rubber tire, as shown in Fig. 1, the operator of the machine will be sure of obtaining the proper amount of compression. If for any reason the rubber tire has not been fitted properly within the channel-iron, it would be necessary to pull or stretch the rubber tire until the free end of same overlaps, as shown in Fig. 1. A clamp $f$ (shown in detail in Fig. 11) is then employed for clamping the rubber tire firmly within the channel of the wheel at a point some distance from the stationary jaw $d$, as shown in Fig. 1. Said clamp is provided with a slotted portion $f^2$, so that it is only necessary to unloosen the nuts, and by swinging this upper portion around the clamp can readily be removed. The clamp $d'$ is then placed on the wires, and the operating-lever $c$ is connected to said jaws by means of the push-rod $c^4$. The clamp $d'$ is thus shown to be supported by the wires and is slidingly mounted thereon. Before operating the lever $c$ a guide-plate $g$, supported at one end in the channel and at the other on the jaws $d$, is used to prevent the rubber from sagging when the lever $c$ is operated. In order to compress the rubber tire, the lever $c$ is forced upwardly, sliding the jaws $d'$ on the wires to a point when the jaws $d'$ can be tightened against the retaining-wires, and the lever $c$ can then be dropped down to engage another notch in said push-rod $c^4$, such that the rubber can be compressed further. By loosening the jaws of the clamp $d'$ and again operating the lever $c$ the rubber tire can be compressed to a point depending on the wishes of the operator. Having compressed the rubber sufficiently and tightened the jaws $d'$, the wires can be released from the opening in the block $b'$, or same may be cut at a point which will enable the operator to place the clamp $d'$ within the channel-iron in a position for tightening the wires. Before the wires are tightened the pulling-up wires $h$ are placed around the rubber, between the clamp $f$ and the jaws $d'$, in the manner shown in Fig. 2. The plate $g$ is then removed and the rubber and jaws $d'$ pushed down into place within the channel. By means of the two screws $e$ the jaws $d \; d'$ can be pulled together and the wires given the necessary amount of tension. The ends of the retaining-wires passing through the jaws of the clamp $d'$ can then be scarfed or filed on their upper sides to fit the ends of the opposite wires.

In operating the tightening devices for the wires I have shown the nut $e^2$, which is operated on the screw-threaded portion of the bolt $e$, and the projecting portions $e^3$ are adapted to engage with a portion of the jaw to keep said nut from turning, and the bolts are turned by means of a screw-driver or other suitable tool operating in the slotted ends of the heads $e'$ of said bolts. The ends of the wire are united in any suitable manner, preferably by brazing or welding, though the machine is more especially adapted for brazing. As soon as the wires are united the jaws are removed, the clamps $a^2$ and $a^3$ are loosened, and the wheel moved to the left so that the spoke will come on the left side of the support $a'$, after which the clamps $a^2$ and $a^3$ are again tightened. The jaws $d$ and $d'$ may then be removed. The wheel is then in position for closing the space between the ends of the rubber tire, and for this purpose I employ a curved pulling-up bar $h'$, to which the flexible bars $h$ are attached by clamping the free ends thereof under the nuts, as shown in Fig. 3. To the end of this pulling-up bar $h'$ is pivoted a bar $h^2$, provided with a series of perforations $h^3$, which bar extends in proximity to the operating-lever $c$, the projecting pin $c^2$ of which is adapted to engage in the perforations $h^3$ of said bar, and thus by operating said lever the ends of the rubber may be drawn together.

Having thus described my invention, I claim—

1. In a rubber-tire machine, the combination with the wheel-support, with a lever on said support, stationary and movable band-holding devices, a clamp to hold the wheel stationary on said support, and means including push and pulling bars operated by the movement of said lever in one direction to compress the tire and by the movement of said lever in the opposite direction to pull the ends of the tire together in the wheel-channel, substantially as specified.

2. In a rubber-tire machine, the combination with the wheel-support, with a lever on said support, stationary band-holding devices, a clamp to hold the wheel on the support and said band-holding devices stationary with one end of the band and tire in place in the wheel-channel, of a block to hold the other end of said bands in a line tangent to the wheel-rim extending over said stationary band-holding devices, movable band-holding devices supported by bands on said tangent line, and means including push and pulling bars operated by the movement of said lever in one direction to compress the tire, and by the movement of said lever in the opposite direction to pull the ends of the tire together in the wheel-channel, substantially as specified.

3. In a rubber-tire machine, the combination with the wheel-support having a lateral extension to carry the wheel, a lever on said support, stationary band-holding devices, a clamp to hold the wheel on the support and said band-holding devices stationary with one end of the band and tire in place in the wheel-channel, of a block on said support to hold the other ends of the bands in a line tangent to the wheel-rim extending over said band-holding devices, movable band-holding devices supported by the bands on said tangent line and resting against the other end of said tire, a hand-lever and adjustable push-bar on said support to force said movable band-holding devices against the end of said tire to compress the tire, substantially as specified.

4. In a rubber-tire machine, the combination with the wheel-support having a lateral extension to carry the wheel, a lever on said support, stationary band-holding devices, a clamp to hold the wheel on the support and said band-holding devices stationary with one end of the band and tire in place in the wheel-channel, of a block on said support to hold the other ends of the bands in a line tangent to the wheel-rim extending over said band-holding devices, movable band-holding devices supported by the bands on said tangent line and resting against the other ends of said tire, a tire-clamp on the wheel, a hand-lever and adjustable push-bar pivoted to said block to force said movable band-holding devices against the end of said tire to press the tire against said tire-clamp, and a guide-plate for said bands resting on said first-named band-holding devices and the wheel-channel, substantially as specified.

In testimony whereof I have hereunto set my hand this 31st day of July, A. D. 1901.

ALVARO S. KROTZ.

Witnesses:
  CHAS. I. WELCH,
  CLIFTON P. GRANT.